United States Patent
Taylor et al.

(10) Patent No.: US 10,523,612 B2
(45) Date of Patent: *Dec. 31, 2019

(54) MESSAGE HISTORY DISPLAY SYSTEM AND METHOD

(71) Applicant: EBUDDY TECHNOLOGIES B.V., Amsterdam (NL)

(72) Inventors: Paulo Taylor, Amsterdam (NL); Jan-Joost Rueb, Amsterdam (NL); Onno Bakker, Haarlem (NL)

(73) Assignee: eBuddy Technologies B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/954,887

(22) Filed: Nov. 30, 2015

(65) Prior Publication Data
US 2016/0094505 A1 Mar. 31, 2016

Related U.S. Application Data

(63) Continuation of application No. 11/637,964, filed on Dec. 11, 2006, now Pat. No. 9,250,984.
(Continued)

(51) Int. Cl.
*H04L 12/58* (2006.01)
*H04M 3/493* (2006.01)
(Continued)

(52) U.S. Cl.
CPC ............ *H04L 51/16* (2013.01); *G06F 9/542* (2013.01); *G06F 16/958* (2019.01); *G06Q 10/10* (2013.01);
(Continued)

(58) Field of Classification Search
USPC ........................................................ 709/206
See application file for complete search history.

(56) References Cited

U.S. PATENT DOCUMENTS 4,531,184 A 7/1985 Wigan et al.
6,415,313 B1 7/2002 Yamada et al.
(Continued)

FOREIGN PATENT DOCUMENTS

EP  0 854 655 A2 * 7/1998
EP  1292071     9/2002
(Continued)

OTHER PUBLICATIONS

Experts Exchange, LLC, "How to make blinking minimized form in title bar vb.net," Jul. 7, 2004 [retrieved online at https://www.experts-exchange.com/questions/20946835/how-to-make-blinking-minimized-form-in-title-bar-vb-net.html#answer10778413 on Jan. 9, 2017].

(Continued)

*Primary Examiner* — Hermon Asres
(74) *Attorney, Agent, or Firm* — Ahmann Kloke LLP

(57) ABSTRACT

A technique for message history display includes combining message histories for multiple different messaging services. A system constructed according to the technique may include, for example, a message history database; a history aggregation engine that aggregates message logs for storage in the message history database; and a history provisioning engine that provides an aggregated message log associated with the user from the message history database to a requesting device. A method according to the technique may include, for example, identifying a device in association with a user profile; providing an online platform that receives messages from and sends messages to the device; and creating an aggregated log from messages sent to and from the device.

16 Claims, 8 Drawing Sheets

Related U.S. Application Data

(60) Provisional application No. 60/748,988, filed on Dec. 9, 2005.

(51) Int. Cl.
    *G06F 16/958*     (2019.01)
    *G06Q 10/10*     (2012.01)
    *H04L 29/08*     (2006.01)
    *H04L 29/06*     (2006.01)
    *G06F 9/54*     (2006.01)
    *H04M 1/725*     (2006.01)

(52) U.S. Cl.
CPC ........... *G06Q 10/107* (2013.01); *H04L 51/00* (2013.01); *H04L 51/04* (2013.01); *H04L 51/043* (2013.01); *H04L 65/403* (2013.01); *H04L 67/02* (2013.01); *H04L 67/1044* (2013.01); *H04L 67/2814* (2013.01); *H04L 67/2823* (2013.01); *H04L 67/306* (2013.01); *H04M 3/493* (2013.01); *H04L 51/066* (2013.01); *H04L 51/22* (2013.01); *H04L 65/00* (2013.01); *H04M 1/72547* (2013.01)

(56) References Cited

U.S. PATENT DOCUMENTS

| | | |
|---|---|---|
| 6,415,318 B1 | 7/2002 | Aggarwal et al. |
| 6,484,196 B1* | 11/2002 | Maurille ............. H04L 12/1831 |
| | | 370/260 |
| 6,571,234 B1 | 5/2003 | Knight et al. |
| 6,993,327 B2 | 1/2006 | Mathis |
| 7,042,879 B2 | 5/2006 | Eschbach et al. |
| 7,389,324 B2 | 6/2008 | Masonis et al. |
| 7,426,382 B2 | 9/2008 | Aerrabotu et al. |
| 7,496,379 B2 | 2/2009 | Kaplan et al. |
| 7,512,619 B2 | 3/2009 | Burkhardt |
| 7,523,138 B2 | 4/2009 | Gruhl et al. |
| 7,587,501 B2 | 9/2009 | Stillion et al. |
| 7,636,755 B2 | 12/2009 | Blattner et al. |
| 7,730,144 B2 | 6/2010 | Taylor et al. |
| 7,779,076 B2 | 8/2010 | Heikes et al. |
| 7,933,957 B2 | 4/2011 | Daniell et al. |
| 8,037,212 B2 | 10/2011 | Taylor et al. |
| 8,135,774 B2 | 3/2012 | Ryabchun et al. |
| 8,458,347 B2 | 6/2013 | Polis et al. |
| 2001/0026231 A1 | 10/2001 | Satoh |
| 2002/0063735 A1 | 5/2002 | Tamir et al. |
| 2002/0077080 A1 | 6/2002 | Greene |
| 2002/0091770 A1 | 7/2002 | Takakura et al. |
| 2002/0143916 A1 | 10/2002 | Mendiolo et al. |
| 2002/0154153 A1 | 10/2002 | Messinger et al. |
| 2003/0028597 A1 | 2/2003 | Saimi et al. |
| 2003/0061382 A1 | 3/2003 | Brown et al. |
| 2003/0076367 A1 | 4/2003 | Bencze et al. |
| 2003/0088676 A1 | 5/2003 | Smith et al. |
| 2003/0131061 A1 | 7/2003 | Newton et al. |
| 2003/0210265 A1 | 11/2003 | Haimberg |
| 2003/0222907 A1 | 12/2003 | Heikes et al. |
| 2003/0225846 A1 | 12/2003 | Heikes et al. |
| 2004/0010808 A1 | 1/2004 | DeCarmo |
| 2004/0015547 A1 | 1/2004 | Griffin et al. |
| 2004/0054646 A1 | 3/2004 | Daniell et al. |
| 2004/0054802 A1 | 3/2004 | Beauchamp et al. |
| 2004/0083297 A1* | 4/2004 | Gazzetta ................. H04L 51/04 |
| | | 709/229 |
| 2004/0158609 A1 | 8/2004 | Daniell et al. |
| 2004/0158610 A1 | 8/2004 | Davis et al. |
| 2004/0185874 A1 | 9/2004 | Kim et al. |
| 2004/0221224 A1 | 11/2004 | Blattner et al. |
| 2004/0243941 A1 | 12/2004 | Fish |
| 2005/0038868 A1 | 2/2005 | Spicer |
| 2005/0038876 A1 | 2/2005 | Chaudhuri |
| 2005/0080867 A1 | 4/2005 | Malik et al. |
| 2005/0097061 A1 | 5/2005 | Shapiro et al. |
| 2005/0108341 A1 | 5/2005 | Mathew et al. |
| 2005/0114454 A1 | 5/2005 | D'Angelo et al. |
| 2005/0119910 A1 | 6/2005 | Schneider |
| 2005/0187781 A1 | 8/2005 | Christensen |
| 2005/0216300 A1 | 9/2005 | Appelman et al. |
| 2005/0259656 A1 | 11/2005 | Dollar et al. |
| 2005/0268237 A1 | 12/2005 | Crane et al. |
| 2006/0080392 A1 | 4/2006 | Kawakami et al. |
| 2006/0095562 A1* | 5/2006 | Agarwal ................. G06F 9/546 |
| | | 709/224 |
| 2006/0168054 A1 | 7/2006 | Burkhart et al. |
| 2006/0248157 A1 | 11/2006 | Daniell et al. |
| 2006/0256816 A1 | 11/2006 | Yarlagadda et al. |
| 2006/0265381 A1 | 11/2006 | Altaf et al. |
| 2006/0268828 A1 | 11/2006 | Yarlagadda |
| 2006/0271630 A1 | 11/2006 | Bensky et al. |
| 2006/0277053 A1 | 12/2006 | Lobb et al. |
| 2007/0043878 A1 | 2/2007 | Carlson et al. |
| 2007/0135099 A1 | 6/2007 | Taylor et al. |
| 2007/0136419 A1 | 6/2007 | Taylor et al. |
| 2007/0168451 A1 | 7/2007 | Taylor et al. |
| 2007/0168529 A1 | 7/2007 | Taylor et al. |
| 2007/0168558 A1 | 7/2007 | Taylor et al. |
| 2007/0192479 A1 | 8/2007 | Felten |
| 2007/0300164 A1* | 12/2007 | Bhogal ............... G06F 3/04817 |
| | | 715/753 |
| 2008/0182559 A1 | 7/2008 | Pyhalammi et al. |
| 2009/0125591 A1* | 5/2009 | Kirkpatrick ............. H04L 51/04 |
| | | 709/206 |
| 2009/0187536 A1* | 7/2009 | Jackson ................. G06F 9/505 |
| 2010/0099421 A1 | 4/2010 | Patel et al. |
| 2010/0228747 A1 | 9/2010 | Taylor et al. |
| 2010/0325222 A1 | 12/2010 | Taylor et al. |

FOREIGN PATENT DOCUMENTS

| | | |
|---|---|---|
| WO | 9948011 | 9/1999 |
| WO | 01020474 | 3/2001 |
| WO | 01043357 | 6/2001 |
| WO | 03056764 | 7/2003 |
| WO | 2004027562 | 9/2003 |
| WO | 2004031976 | 4/2004 |
| WO | 2004079530 | 9/2004 |
| WO | 2005045591 | 5/2005 |
| WO | 2005074588 | 8/2005 |
| WO | 2006083820 | 8/2006 |
| WO | 2007063041 | 6/2007 |
| WO | 2007110703 | 10/2007 |
| WO | 2007129143 | 11/2007 |
| WO | 2007129144 | 11/2007 |
| WO | 2008072028 | 6/2008 |
| WO | 2008072030 | 6/2008 |

OTHER PUBLICATIONS

MozillaZine, "URL displayed in the title bar when we used open window," Apr. 29, 2005 [retrieved online at http://forums.mozillazine.org/viewtopic.php?f=38&t=258175&start=0&st=0&sk=t&sd=a on Jan. 9, 2017].

PC Magazine, "Instant-messaging aggregators," May 4, 2005 [retrieved online at http://www.pcmag.com/article2/0,2817,1791523,00.asp on Jan. 9, 2017].

PC Review, "Change titlebar text in VB code," Jan. 19, 2004 [retrieved online at https://www.pcreview.co.uk/threads/change-titlebar-text-in-vb-code.1080539/ on Jan. 9, 2017].

PC Review, "Yahoo Messenger and the flashing taskbar message," Jan. 15, 2004 [retrieved online at https://www.pcreview.co.uk/threads/yahoo-messenger-and-the-flashing-taskbar-message.1504897/ on Jan. 9, 2017].

International Application No. PCT/IB2006/04193, International Search Report and Written Opinion dated Jun. 24, 2008.

International Application No. PCT/IB2006/04200, International Search Report and Written Opinion dated Oct. 23, 2007.

International Application No. PCT/IB2006/04204, International Search Report and Written Opinion dated Jan. 8, 2008.

(56) References Cited

OTHER PUBLICATIONS

International Application No. PCT/IB2006/04205, Corrected International Search Report and Written Opinion dated Apr. 4, 2008.
International Application No. PCT/IB2006/04264, International Search Report and Written Opinion dated Jun. 30, 2008.
International Application No. PCT/US2012/000046, International Search Report and Written Opinion dated Apr. 2, 2012.

* cited by examiner

MESSAGE HISTORY DISPLAY SYSTEM AND METHOD

CROSS-REFERENCE TO RELATED APPLICATIONS

This Patent Application is a continuation of U.S. patent application Ser. No. 11/637,964, filed Dec. 11, 2006, entitled "Message History Display System and Method," which claims priority to U.S. Provisional Application No. 60/748,988, filed Dec. 9, 2005, which is incorporated herein by reference. Further, this patent application is related to U.S. patent application Ser. No. 11/637,954, filed Dec. 11, 2006, now U.S. Pat. No. 7,730,144, entitled "High Level Network Layer System And Method," Ser. No. 11/637,268, filed Dec. 11, 2006, now U.S. Pat. No. 8,700,713, entitled "Picture Provisioning System and Method," Ser. No. 11/637,514, filed Dec. 11, 2006, now U.S. Pat. No. 8,037,212, entitled "Event Notification System and Method," and Ser. No. 11/637,316, filed Dec. 11, 2006, entitled, "Contact List Display System and Method," all of which are incorporated by reference herein.

BACKGROUND

Instant messaging requires the use of a client program that hooks up an instant messaging service and differs from e-mail in that conversations are then able to happen in real time. Most services offer a presence information feature, indicating whether people on one's list of contacts are currently online and available to chat. This may be called a contact list. In early instant messaging programs, each letter appeared as it was typed, and when letters were deleted to correct typos this was also seen in real time. This made it more like a telephone conversation than exchanging letters. In modern instant messaging programs, the other party in the conversation generally only sees each line of text right after a new line is started. Most instant messaging applications also include the ability to set a status message, roughly analogous to the message on a telephone answering machine.

Popular instant messaging services on the public Internet include NET Messenger Service, AOL Instant Messenger, Excite/Pal, Gadu-Gadu, Google Talk, iChat, ICQ, Jabber, Qnext, QQ, Meetro, Skype, Trillian and Yahoo! Messenger. These services owe many ideas to an older (and still popular) online chat medium known as Internet Relay Chat (IRC).

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for message history display includes combining message histories for multiple different messaging services. A system constructed according to the technique may include, for example, a message history database; a history aggregation engine that aggregates the message logs for storage in the message history database; and a history provisioning engine that provides an aggregated message log associated with the user from the message history database to a requesting device.

A method according to the technique may include, for example, identifying a device in association with a user profile; providing an online platform that receives messages from and sends messages to the device; and creating an aggregated log from messages sent to and from the device.

BRIEF DESCRIPTION OF THE DRAWINGS

Embodiments of the inventions are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention. For example, it is well known that computer-readable media can be implemented on more than one device. It is also well-known that an engine that implements a procedure on a computer system includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

Figure 1:
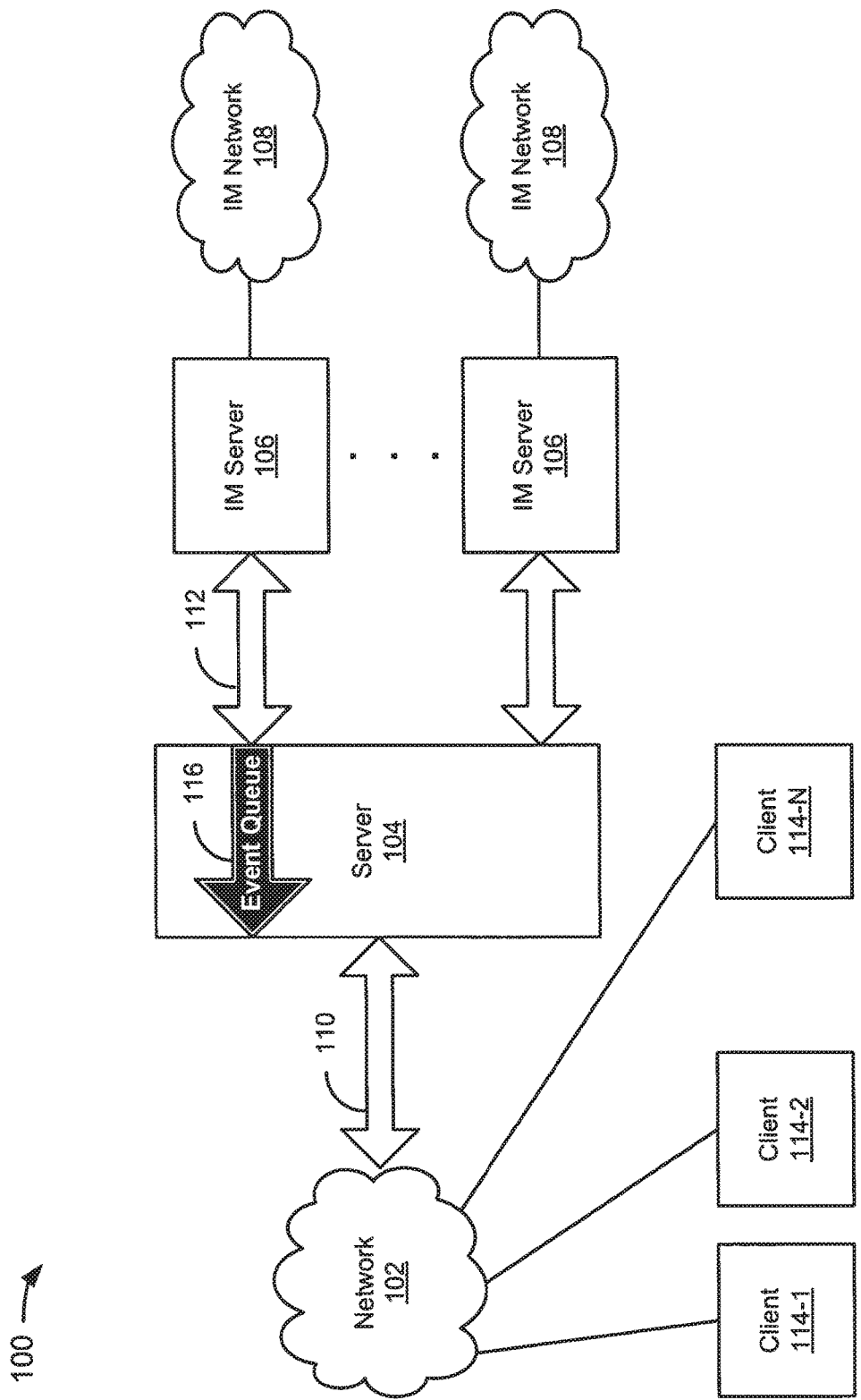
FIG. 1 depicts an example of a system for providing instant messages to clients via a web interface.

FIG. 1 depicts an example of a system 100 for providing instant messages to clients via a web interface. In the example of FIG. 1, the system 100 includes a network 102, a server 104, and an Instant Messenger (IM) server 106, and an IM network 108. The server 104 is coupled to the network at least by way of two way communications. The two way communication (e.g., via port 80) is represented in the example of FIG. 1 as an arrow 110. The server 104 is coupled to the IM server 106 via one or more other ports. The two way communication via the other ports is represented in the example of FIG. 1 as an arrow 112. The IM server 106 is coupled to the IM network 108 via any known or convenient mechanism. Indeed, the IM server 106 may be thought of as part of the IM network 108. The network 102 couples a plurality of clients 114-1 to 114-N (referred to collectively as clients 114) to the server 104. In the example of FIG. 1, the server 104 includes an event queue 116.

The network 102 may include by way of example but not limitation LAN, WAN, VLAN, WLAN, Internet, cellular network, phone network, radio network, or some other known or convenient network. The term "Internet" as used herein refers to a network of networks that uses certain protocols, such as TCP/IP, and possibly other protocols such as the hypertext transfer protocol (HTTP) for hypertext markup language (HTML) documents that make up the World Wide Web (the web). The physical connections of the Internet and the protocols and communication procedures are well known, but any convenient physical connections or protocols could be used.

The server 104 may include a multiple servers. Indeed, it may be desirable, depending upon details of a particular implementation, to install several servers to cope with the number of simultaneous users the system 100 supports. It may further be desirable, depending upon details of a particular implementation, for the server 104 to have a high CPU throughput, together with large amounts of RAM, to handle a large number of users. It may further be desirable, depending upon details of a particular implementation, to accomplish resource sharing via thread handling where a pool of threads is shared and used by one or more of the clients 114 for client-server communication and between the server 104 and the IM server 106.

The server 104 may include one or more of an application server, database server, web server, banners server, and content server, or any combination thereof. To make the most of the techniques described herein, the server 104 should, though is not required to, include at least one application server. The other servers can have supporting roles in, by way of example but not limitation, serving static content or advertising (e.g., banners), storing usage data, or fulfilling some other known or convenient function.

The server 104 may act as a proxy server between the clients 114 and the IM server 106. The server 104 receives communications from the clients 114 on http port 80, and responds to the clients 114 on http port 80. Communications from the clients 114 that are bound for the IM network 108, however, must also come through http port 80 to the server 104, and are then forwarded to the IM server 106. In this way, the server 104 acts as a carrier of the data from users to the IM network 108 using a mechanism that controls and manages the data (e.g., text messages, display images, emoticons, audio/video streams, etc.) sent between one of the clients 114 and the server 104, and vice versa.

The IM server 106 may be any known or convenient IM server that is compatible with IM. Events, messages, or other appropriate data from the IM server 106 are collected in the event queue 116 of the server 104. The events may be collected in association with a variety of protocols including by way of example but not limitation port 1863, port 5050, port 5222, port 5190, etc.

The IM network 108 may include one or a combination of networks selected from MSN Messenger, Yahoo! Messenger, AIM AOL, ICQ, QQ, Jabber, Google Talk, IRC, or some other known or convenient IM network.

The clients 114 may include any known or convenient device, including by way of example but not limitation, a Web browser, mobile client, PDA, game console, TV box, native application, etc. The clients poll the server 104 for events. The events can be removed from the event queue 116 and translated into text, JavaScript, XML, or some other known or convenient format that one or more of the clients 114 need or expect in order to process data associated with the event.

To interact with the IM network 108, the clients 114 send data to the server 104. The data, which may include commands, is processed and translated into corresponding data that will be sent to the appropriate IM network. In an embodiment, the appropriate IM network may be determinable based upon the protocol encoded in a message.

Messages or actions from the clients 114 are collected over network protocols such as, by way of example but not limitation, HTTP or plain socket connections. The messages or actions are transformed to an appropriate protocol format to be sent over a compliant port from the clients 114 to the server 104, with the IM protocol on the application side. In a non-limiting embodiment, the compliant port is http port 80. However, any port having similar characteristics to those of a typical port 80 could be used.

The latest available browsers, as of December 2005, enable the use of a technique called AJAX (Asynchronous JavaScript And XML). With AJAX, appropriately configured clients 114 can execute actions and poll for messages or events using only JavaScript. The method is based on using an XMLHttpRequest object to make HTTP requests to the server 104. The server 104 may reply with messages taken from the queue of the corresponding session in XML (or another) format that are parsed and displayed according to the message content.

For clients 114 that include a browser, when accessing the server 104 the browser typically uses hidden HTML frames to update information on visible frames. The visible frames display appropriate information while the hidden frames are reloaded in short periods of time. In each refresh that hits the server 104, the browser identifies the current messaging session and checks if new events or messages associated with the session are in the event queue 116. When new information arrives and needs to be displayed in some form, the browser makes use of, for example, JavaScript code to update the visible frames and windows with new messages or events keeping the information up to date in the screen. In this way, automatic refreshing can take place in a hidden frame.

In another embodiment, certain of the clients 114 with browsers may not make use of refreshes. For example, a form of updating the screen without using a refresh technique is to keep one single HTTP socket request alive for the whole period of a messaging session without actually closing the socket connection. In this example, information is initially loaded and displayed in one single visible frame. While events and messages are being received by the server 104, JavaScript code can be injected into the HTML document through the same HTTP socket kept alive and managed by the server 104. For each event or message, the browser can interpret the JavaScript code injected and the corresponding parts of the HTML document and windows will be updated.

In another embodiment, certain of the clients 114 with browsers may make use of manual refreshes. Some relatively unsophisticated browsers, such as WAP and xHTML browsers often available on mobile phones, do not support hidden frames and/or JavaScript (and others may be configured such that they do not support hidden frames and/or JavaScript). In such cases, the information displayed has to be updated manually by the user. Manual updating enables any mobile phone, PDA, TV Set or any device with a browser to connect to the server 104 and use the messaging platforms made available by the server 104 assuring the communication between the clients 114 and the IM server 106.

Message history can be stored by most IM clients on a local computer. For alternative web and mobile-based clients local storage may not be possible. In a non-limiting embodiment, the server 104 may have the capability to store message history from IM conversations done via one or more of the clients 114. The message history can be accessed and searched at any time via the server 104 by one or more of the clients 114.

Figure 2:
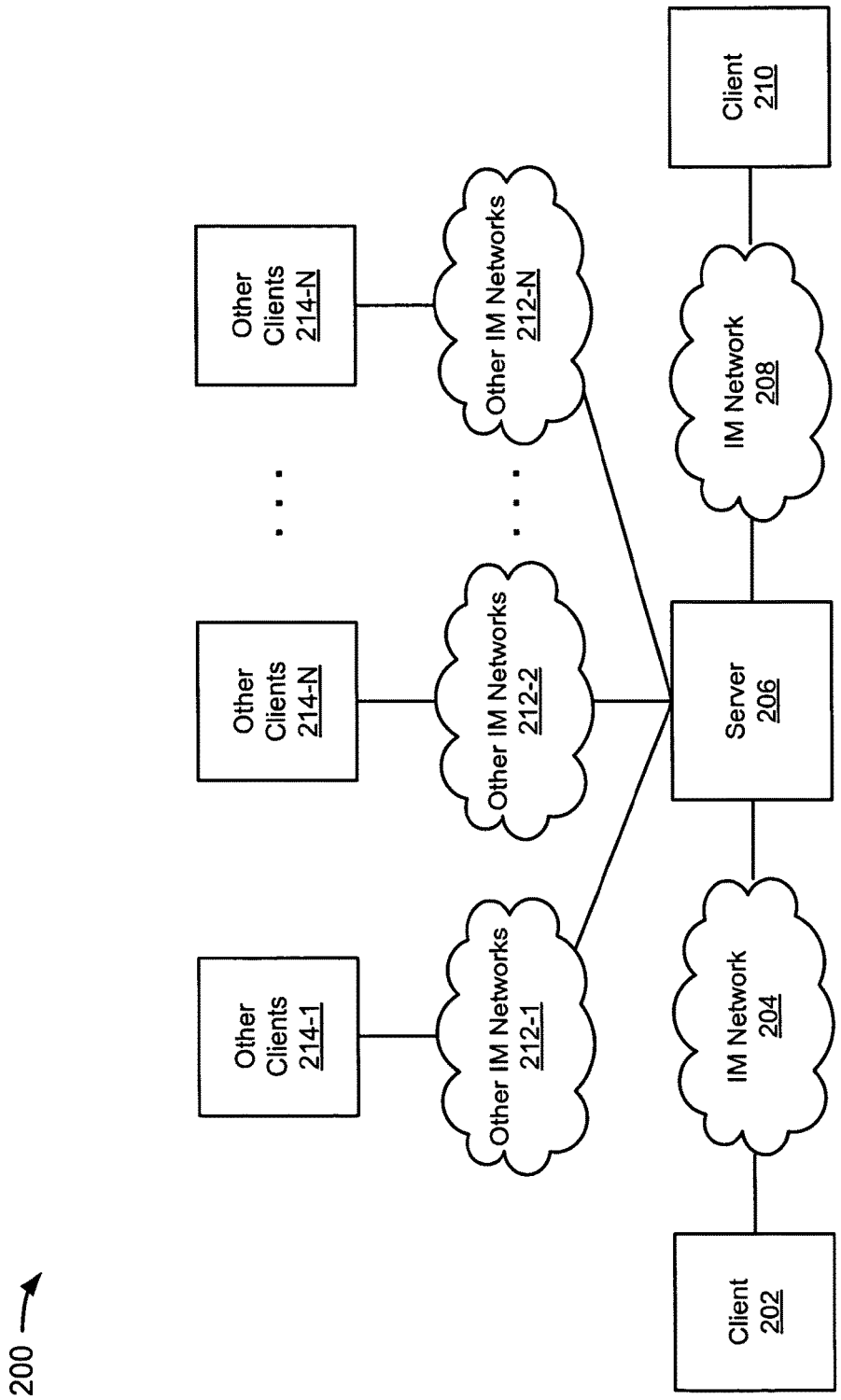
FIG. 2 depicts an example of a system for displaying content from an IM client at an alternative IM client.

FIG. 2 depicts an example of a system 200 for displaying content from an IM client at an alternative IM client. In the example of FIG. 2, the system 200 includes a client 202, an IM network 204, a server 206, an IM network 208, a client 210, other IM networks 212-1 to 212-N (referred to collectively as other IM networks 212), and other clients 214-1 to 214-N (referred to collectively as other clients 214).

For illustrative purposes, it is assumed that the client 202 has content that is compatible with the IM network 204. However, the client 210 is capable of reading content formatted to be compatible with the IM network 208. Thus, in operation, the server 206 collects content from the client 202 (either through the IM network 204, as shown in FIG. 2, or directly from the client 202, such as is shown by way of example in FIG. 1). The server 206 then formats the content as appropriate for use on the IM network 208. Once the content is properly formatted, it can be made available to the client 210 (either through the IM network 208, as shown in FIG. 2, or directly to the client 210, such as is shown by way of example in FIG. 1). Depending upon the embodiment and/or implementation, the content may also be formatted as appropriate for one or more of the other IM networks 212, to be made available for one or more of the other clients 214.

In an embodiment, the server 206 can save the content in one or many formats. In this way, the client 202 could make content available in a first IM format, the server 206 could convert the content into a second IM format, and the server 206 can save the content in at least the second IM format. Thus, the client 210 could receive the data in the second IM format. The server 206 could easily store the content in the first IM format, as well, and make the content available to other clients coupled to the IM network 204. In addition, the server 206 could convert the content to other IM formats, such as those formats that are associated with the other IM networks 212, and save the other IM formats. In this way, the other clients 214 may have access to the content.

The client 202 and the client 210 (and the clients 214) may or may not be associated with a single user. Advantageously, when a single user is associated with more than one client, the user can view content at any one client normally available on some other type of network. Thus, for example, a user who uses a cell phone for chat and an IM client for chat can view an aggregation of a mobile phone chat log and an IM chat history on the cell phone or on the IM client.

Figure 3:
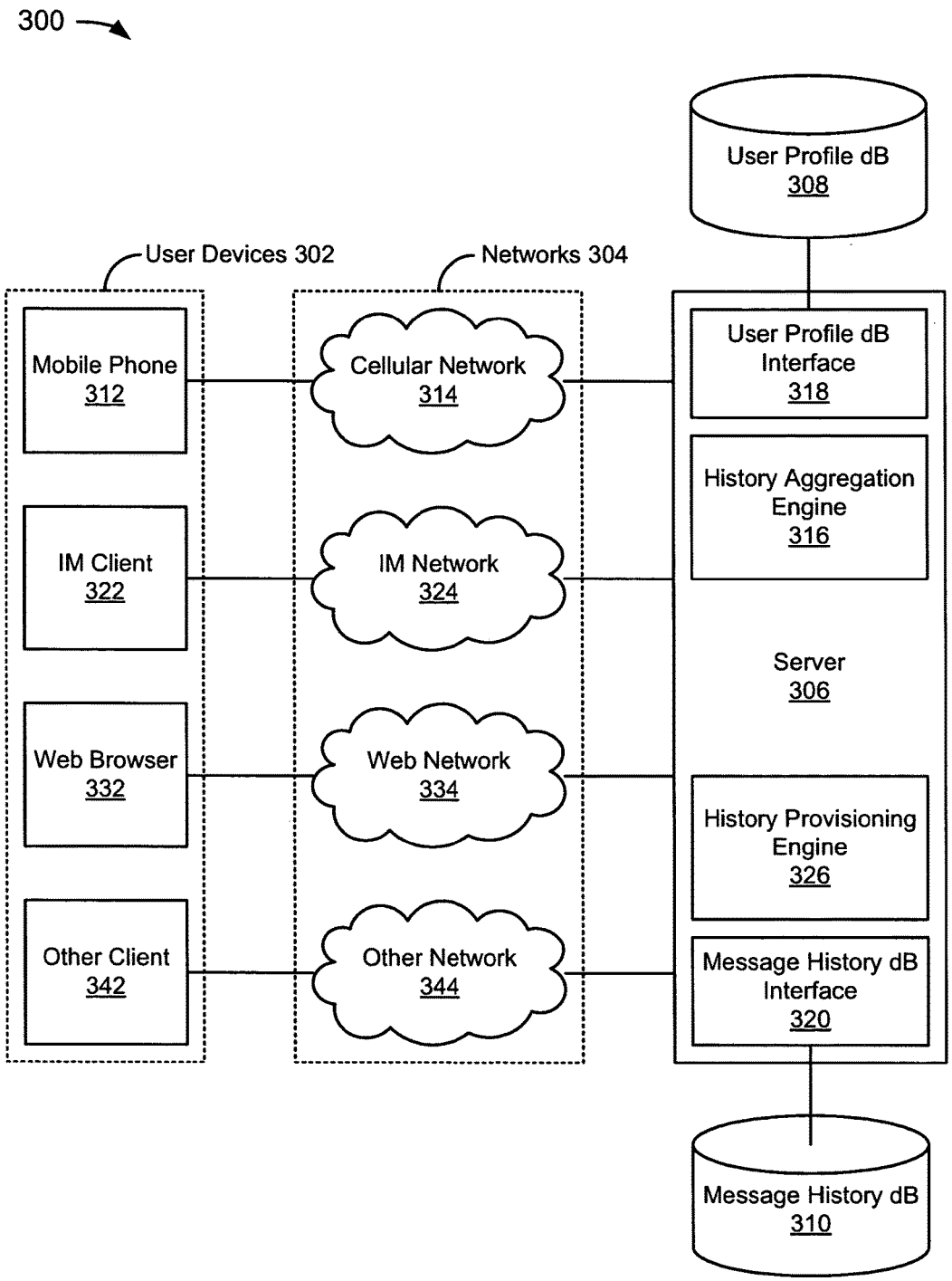
FIG. 3 depicts an example of a system for message history aggregation and provisioning.

FIG. 3 depicts an example of a system 300 for message history aggregation and provisioning. The system 300 includes user devices 302, network 304, a server 306, a user profile database 308, and a message history database 310.

The user devices 302 may include a mobile phone 312, an IM client 322, a web browser 332, and other client 342. The networks 304 may include a cellular network 314 coupled to the mobile phone 312, an IM network 324 coupled to the IM client 322, a web network 334 coupled to the web browser 332, and other network 344 coupled to the other client 342. Each of the networks 304 is coupled to the server 306. It may be noted that the other client 342 may include another mobile phone, IM client, web browser, or some other known or convenient client. Similarly, the other network 344 may include a cellular network, IM network, web network, or some other known or convenient network.

In the example of FIG. 3, the server 306 includes a history aggregation engine 316, a user profile database interface 318, a message history database interface 320, and a history provisioning engine 326. The user profile database interface 318 and the message history database interface 320 may be incorporated into a single database interface, depending upon the implementation.

The history aggregation engine 316, which may be embodied in a computer-readable medium at the server 306, is for taking message histories from a plurality of environments associated with a single user identified in the user profile database 308 and aggregating the message histories in the message history database 310.

For example, a mobile phone chat log associated with the mobile phone 312 may be stored on the mobile phone 312, in the cellular network 314, or elsewhere. The history aggregation engine 316 can access the user profile database 308 through the user profile database interface 318 to determine where the mobile phone chat log is stored (or, for example, the mobile phone 312 could be queried). The mobile phone chat log can be stored in its current format in the message history database 310, or the mobile phone chat log could be converted to a generic format or some other format (e.g., an XML format) prior to storage in the message history database 310. Regardless of the format chosen by implementation or configuration, the history aggregation engine 316 can provide some or all of the mobile phone chat log to the message history database interface 320 for storage in the message history database 310.

As another example, an IM chat history associated with the IM client 314 may be stored on the IM client 322, in the IM network 324, or elsewhere (e.g., on a high level IM network server). As with the mobile phone chat log example, the history aggregation engine 316 can access the user profile database 308 through the user profile database interface 318 to determine where the IM chat history is stored and convert some or all of the IM chat history, if necessary, for storage in the message history database 310.

As another example, a web-based chat history associated with the web browser 332 may be stored on a computer on which the web browser 332 is embodied in a computer-readable medium, in the web network 334, or elsewhere. The history aggregation engine 316 can access the user profile database 308 through the user profile database interface 318 to determine where the web-based chat history is stored and convert some or all of the web-based chat history, if necessary, for storage in the message history database 310. In one implementation, all of the other histories are converted into a web-based format, and aggregated for a user for display on the web browser 332. Of course, in other implementations, other formats (or a generic format so that display is facilitated on any of the user's devices) can be used.

The history provisioning engine 326, which may be embodied in a computer-readable medium at the server 306, may take a request for a log from one of the user devices 302 and query the message history database interface 320 for an aggregated log stored in the message history database 310. Depending upon the implementation, the history provisioning engine 326 may receive a plurality of logs in different formats associated with each of the user devices 302 and convert the different formats into a format suitable for display on the device from which a request for a log was received; receive a plurality of logs, each of which is in a generic format, and convert the generic format into a format suitable for display on the device from which a request for a log was received; or receive a plurality of logs, each of which is in a particular format (e.g., XML) and convert the particular format into a format suitable for display on the device from which a request for a log was received, if the device is not suited to display the particular format. Alternatively, the message history database 310 could include multiple formats for the same log, and the format most suitable for provisioning to a requesting device may be provided to the history provisioning engine 326, which, in this case, would not need to reformat the log. In any case, the history provisioning engine 326 provides the aggregated log in a suitable format to a requesting device.

Figure 4:
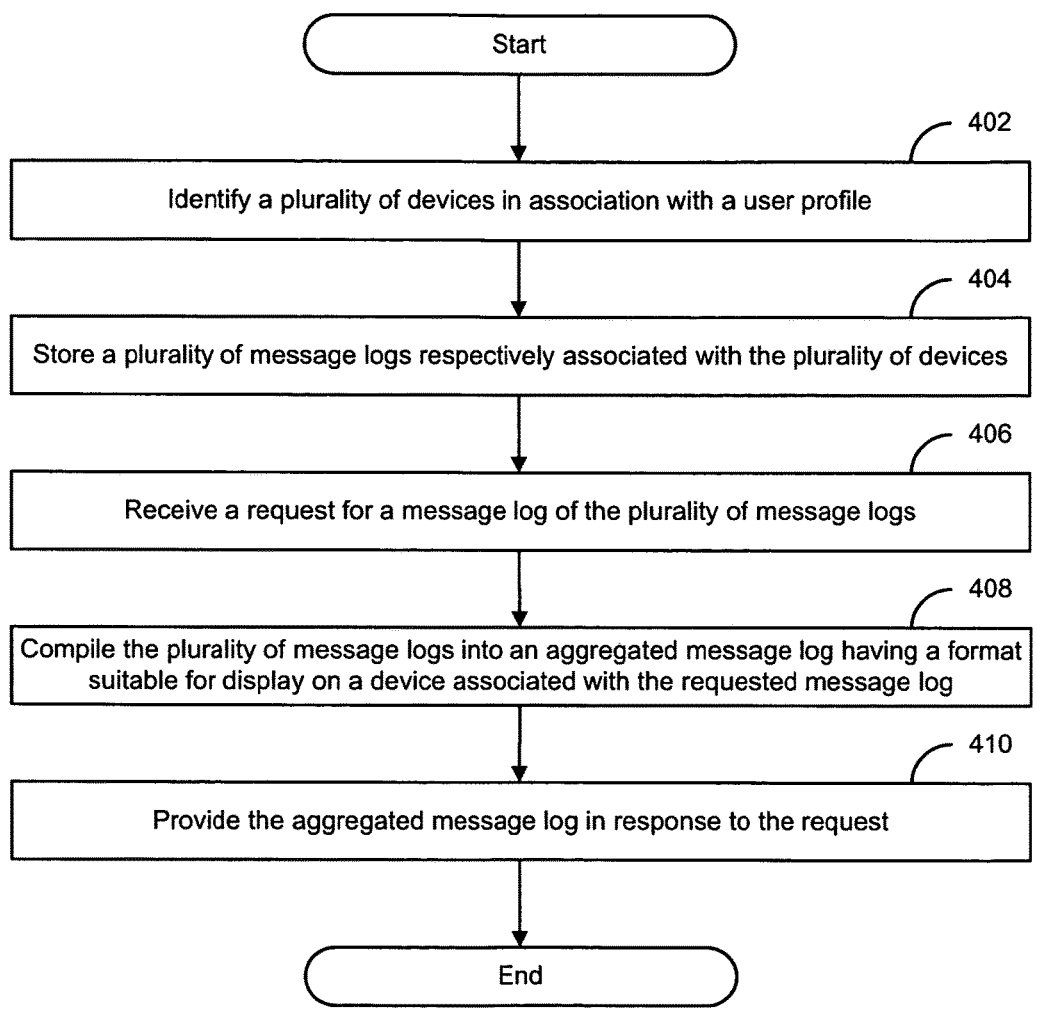
FIG. 4 depicts a flowchart of an example of a method for message log aggregation and provisioning.

FIG. 4 depicts a flowchart 400 of an example of a method for message log aggregation and provisioning. This method and other methods are depicted as serially arranged modules. However, modules of the methods may be reordered, or arranged for parallel execution as appropriate. In the example of FIG. 4, the flowchart 400 begins at module 402 where a plurality of devices are identified in association with a user profile.

In the example of FIG. 4, the flowchart 400 continues to module 404 where a plurality of message logs respectively associated with the plurality of devices are stored. The message logs may or may not be stored on separate devices. For example, an IM chat history may be stored on an IM server, while a mobile phone chat log may be stored on the mobile phone.

In the example of FIG. 4, the flowchart 400 continues to module 406 where a request for a message log of the plurality of message logs is received. Such a request would typically (though not necessarily) be received from a device that uses the messaging protocol that results in the message log. In an alternative, the device may send a request explicitly for the aggregated message log. In such an alternative, a response to a request for the (unaggregated) message log may include the message log and not the aggregated message log.

In the example of FIG. 4, the flowchart 400 continues to module 408 where the plurality of message logs are compiled into an aggregated message log having a format suitable for display on a device associated with the requested message log. The aggregated message log may be compiled on the fly (e.g., when the request is received) or could be stored in advance in anticipation of the request. If stored in advance, multiple redundant aggregated message logs could be stored in different formats, each of which is suitable for display on a device associated with the user profile.

In the example of FIG. 4, the flowchart 400 continues to module 410 where the aggregated message log is provided in response to the request. The aggregated message log would typically (though not necessarily) be sent to the device that uses the messaging protocol that results in the requested message log. In a non-limiting embodiment, the device need not request the aggregated message, but receives it anyway.

In the example of FIG. 4, the various message logs are kept in their native formats. The message logs could reside in known or convenient locations associated with the various formats (e.g., a mobile phone chat log could be stored on the mobile phone). When compiling the various message logs into an aggregated message log, each of the locations may need to be checked for data. This can take some time. Also, some devices may be off (e.g., a mobile phone could be off) or off-line (e.g., an IM server that includes an IM chat log could be down for maintenance), which could result in an incomplete aggregated message log. This problem can be ameliorated by storing the aggregated message log in each possible requested format for a particular user, though this solution may result in wasting storage resources.

Figure 5:
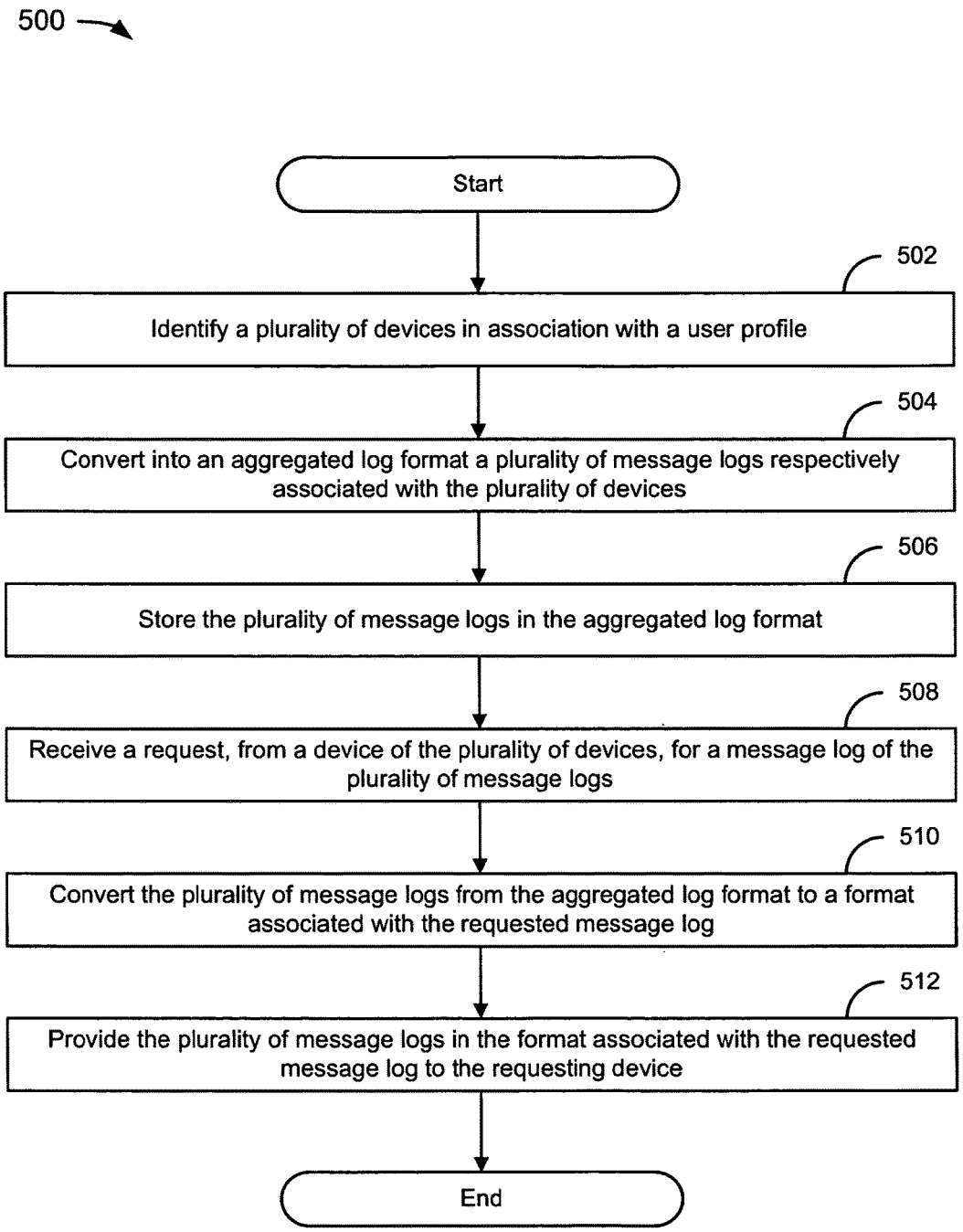
FIG. 5 depicts a flowchart of another example of a method for message log aggregation and provisioning.

FIG. 5 depicts a flowchart 500 of another example of a method for message log aggregation and provisioning. In the example of FIG. 5, various message logs are stored in an aggregated log format. In the example of FIG. 5, the flowchart 500 starts at module 502 where a plurality of devices are identified in association with a user profile.

In the example of FIG. 5, the flowchart 500 continues to module 504 where a plurality of message logs respectively associated with the plurality of devices are converted into an aggregated log format. The aggregated log format may be the same format as would be suitable for display on at least one of the devices associated with a user, or the aggregated log format may be a generic format that would not be displayed on any of a user's devices without reformatting.

In the example of FIG. 5, the flowchart 500 continues to module 506 where the plurality of message logs are stored in the aggregated log format. Advantageously, the plurality of message logs can be (though are not necessarily) collected and stored on a single device or collection of devices that are relatively local with respect to one another. This may improve the speed with which the aggregated message log can be accessed.

In the example of FIG. 5, the flowchart 500 continues to module 508 where a request is received from a device of the plurality of devices for a message log of the plurality of message logs. In an alternative, the request may be explicitly for the aggregated message log. In this alternative, it may be possible to request and receive a non-aggregated message log, as well.

In the example of FIG. 5, the flowchart 500 continues to module 510 where the plurality of message logs are converted from the aggregated log format to a format associated with the requested message log. This conversion may or may not be necessary, depending upon the implementation. For example, the aggregated format may be a format that is not suitable for display without conversion on any of the devices associated with the user profile. As another example, the aggregated format may be a format that is suitable for display on one or more of the devices associated with the user profile (making conversion unnecessary for a subset of the devices), but unsuitable for display on one or more other devices associated with the user profile (making conversion necessary for a subset of the devices).

In the example of FIG. 5, the flowchart 500 continues to module 512 where the plurality of message logs are provided in the format associated with the requested message log to the requesting device. Advantageously, since the format of all of the message logs is converted (if necessary) to a format that is suitable for display on the requesting device, no matter from which device a user requests a message history, the aggregated message history can be displayed.

Figure 6:
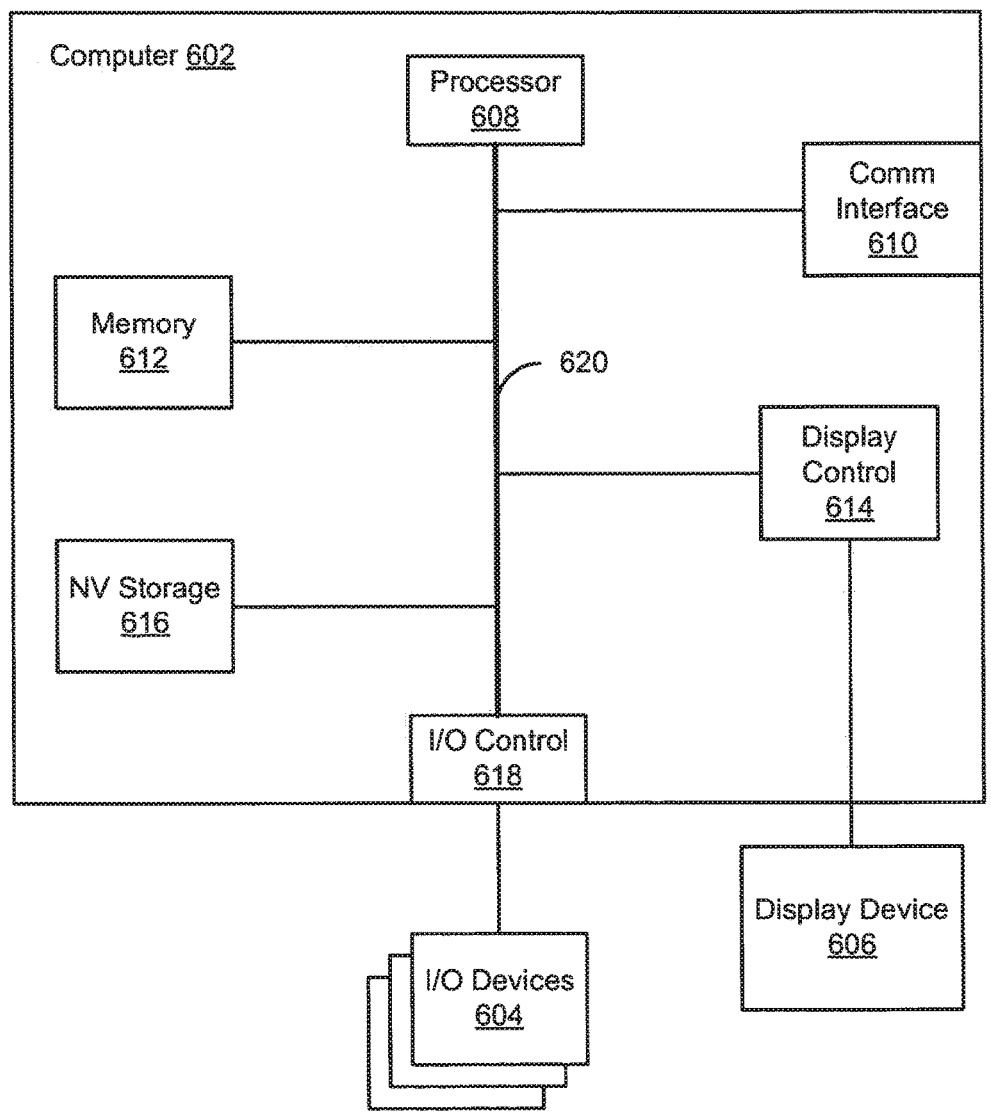
FIG. 6 depicts a computer system suitable for implementation of the techniques described with reference to FIGS. 1-5, 7-8.

FIG. 6 depicts a computer system 600 suitable for implementation of the techniques described above with reference to FIGS. 1-5 (and 7-8, described later). The computer system 600 includes a computer 602, I/O devices 604, and a display device 606. The computer 602 includes a processor 608, a communications interface 610, memory 612, display controller 614, non-volatile storage 616, and I/O controller 618. The computer 602 may be coupled to or include the I/O devices 604 and display device 606.

The computer 602 interfaces to external systems through the communications interface 610, which may include a modem or network interface. The communications interface 610 can be considered to be part of the computer system 600 or a part of the computer 602. The communications interface 610 can be an analog modem, ISDN modem, cable modem, token ring interface, satellite transmission interface (e.g. "direct PC"), or other interfaces for coupling a computer system to other computer systems. Although conventional computers typically include a communications interface of some type, it is possible to create a computer that does not include one, thereby making the communications interface 610 optional in the strictest sense of the word.

The processor 608 may include, by way of example but not limitation, a conventional microprocessor such as an Intel Pentium microprocessor or Motorola power PC microprocessor. While the processor 608 is a critical component of all conventional computers, any applicable known or convenient processor could be used for the purposes of implementing the techniques described herein. The memory 612 is coupled to the processor 608 by a bus 620. The memory 612, which may be referred to as "primary memory," can include Dynamic Random Access Memory (DRAM) and can also include Static RAM (SRAM). The bus 620 couples the processor 608 to the memory 612, and also to the non-volatile storage 616, to the display controller 614, and to the I/O controller 618.

The I/O devices 604 can include a keyboard, disk drives, printers, a scanner, and other input and output devices, including a mouse or other pointing device. For illustrative purposes, at least one of the I/O devices is assumed to be a block-based media device, such as a DVD player. The display controller 614 may control, in a known or convenient manner, a display on the display device 606, which can be, for example, a cathode ray tube (CRT) or liquid crystal display (LCD).

The display controller 614 and I/O controller 618 may include device drivers. A device driver is a specific type of computer software developed to allow interaction with hardware devices. Typically this constitutes an interface for communicating with the device, through a bus or communications subsystem that the hardware is connected to, providing commands to and/or receiving data from the device, and on the other end, the requisite interfaces to the OS and software applications.

The device driver may include a hardware-dependent computer program that is also OS-specific. The computer program enables another program, typically an OS or applications software package or computer program running under the OS kernel, to interact transparently with a hardware device, and usually provides the requisite interrupt handling necessary for any necessary asynchronous time-dependent hardware interfacing needs.

The non-volatile storage 616, which may be referred to as "secondary memory," is often a magnetic hard disk, an optical disk, or another form of storage for large amounts of data. Some of this data is often written, by a direct memory access process, into memory 612 during execution of software in the computer 602. The non-volatile storage 616 may include a block-based media device. The terms "machine-readable medium" or "computer-readable medium" include any known or convenient storage device that is accessible by the processor 508 and also encompasses a carrier wave that encodes a data signal.

The computer system 600 is one example of many possible computer systems which have different architectures. For example, personal computers based on an Intel microprocessor often have multiple buses, one of which can be an I/O bus for the peripherals and one that directly connects the processor 608 and the memory 612 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 612 for execution by the processor 608. A Web TV system, which is known in the art, is also considered to be a computer system, but it may lack some of the features shown in FIG. 6, such as certain input or output devices. A typical computer system will usually include at least a processor, memory, and a bus coupling the memory to the processor.

The computer system 600 may be controlled by an operating system (OS). An OS is a software program—used on most, but not all, computer systems—that manages the hardware and software resources of a computer. Typically, the OS performs basic tasks such as controlling and allocating memory, prioritizing system requests, controlling input and output devices, facilitating networking, and managing files. Examples of operating systems for personal computers include Microsoft Windows®, Linux, and Mac OS®. Delineating between the OS and application software is sometimes rather difficult. Fortunately, delineation is not necessary to understand the techniques described herein, since any reasonable delineation should suffice.

The lowest level of an OS may be its kernel. The kernel is typically the first layer of software loaded into memory when a system boots or starts up. The kernel provides access to various common core services to other system and application programs.

As used herein, algorithmic descriptions and symbolic representations of operations on data bits within a computer memory are believed to most effectively convey the techniques to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer that manipulates and transforms data represented as physical (electronic) quantities within the computer system's registers and memories into other data similarly represented as physical quantities within the computer system memories or registers or other such information storage, transmission or display devices.

An apparatus for performing techniques described herein may be specially constructed for the required purposes, or it may comprise a general purpose computer selectively activated or reconfigured by a computer program stored in the computer. Such a computer program may be stored in a computer readable storage medium, such as, by way of example but not limitation, read-only memories (ROMs), RAMs, EPROMs, EEPROMs, magnetic or optical cards, any type of disk including floppy disks, optical disks, CD-ROMs, DVDs, and magnetic-optical disks, or any known or convenient type of media suitable for storing electronic instructions.

The algorithms and displays presented herein are not inherently related to any particular computer architecture. The techniques may be implemented using any known or convenient programming language, whether high level (e.g., C/C++) or low level (e.g., assembly language), and whether interpreted (e.g., Perl), compiled (e.g., C/C++), or Just-In-Time (JIT) compiled from bytecode (e.g., Java). Any known or convenient computer, regardless of architecture, should be capable of executing machine code compiled or otherwise assembled from any language into machine code that is compatible with the computer's architecture.

Figure 7:
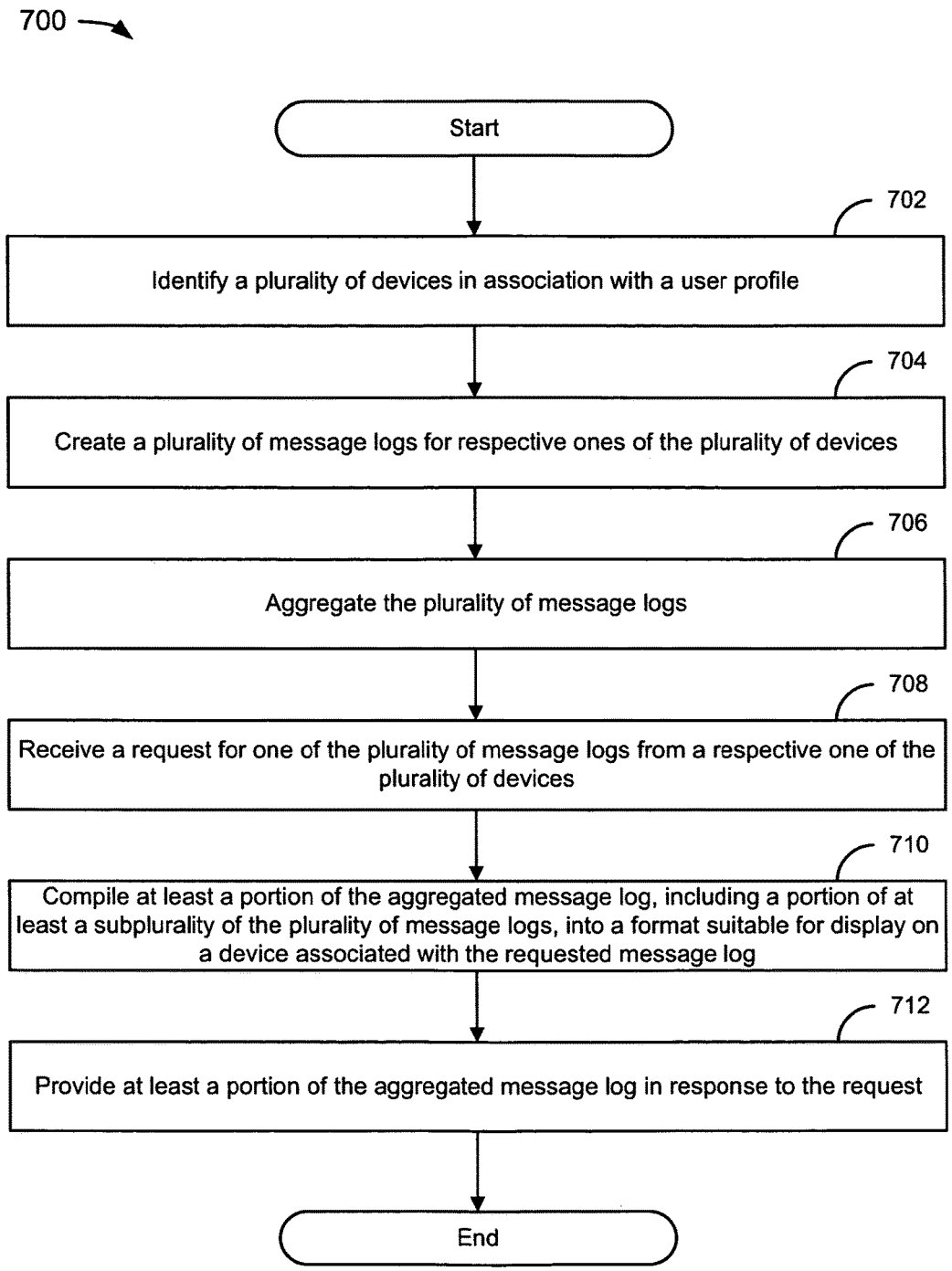
FIG. 7 depicts a flowchart of an example of a method for message log aggregation and provisioning.

FIG. 7 depicts a flowchart 700 of an example of a method for message log aggregation and provisioning. In the example of FIG. 7, the flowchart 700 starts at module 702 where a plurality of devices are identified in association with a user profile. Thus, at least one user of a system will have a plurality (i.e., two or more) devices that are capable of generating message logs. This is not intended to mean that all users of a system must have two devices that are capable of generating message logs. Indeed, as explained later with reference to FIG. 8, it is possible to have users associated with a single device in certain embodiments and/or implementations.

In the example of FIG. 7, the flowchart 700 continues to module 704 where a plurality of message logs are created for a respective plurality of the devices and to module 706 where the plurality of message logs are aggregated. Thus, each device has an associated message log. It should be noted that, in a non-limiting embodiment, the message logs could be created simultaneously as a single log, which would have the effect of, essentially, combining modules 704 and 706.

In the example of FIG. 7, the flowchart 700 continues to module 708 where a request for one of the plurality of message logs is received from a respective one of the plurality of devices. It may be noted that the requesting device may have a NULL message log associated with it, and could still request a message log. Thus, any device associated with a user profile could request a message log. It may also be noted that a device could become identified in association with a user profile (702) after having aggregated the plurality of message logs (708), and still request a message log.

In the example of FIG. 7, the flowchart 700 continues to module 710 where at least a portion of the aggregated message log, including a portion of at least a subplurality of the plurality of message logs, is compiled into a format suitable for display on a device associated with the requested message log. Message logs can become quite long over time. While, as used herein, it is intended that, in some cases where a message log is referred to as "sent" or "provided" that only a portion of the message log may or may not be provided. In the example of FIG. 7, a portion is intended to mean the entire portion or a subportion of the aggregated message log. The message logs may be stored, as they are generated, in the aggregated message log. Indeed, the system may or may not, depending upon the implementation, even be able to distinguish between a message log generated by one device and a message generated by another device. The aggregated message log may be compiled into a format that is suitable for display on a requesting device. If the system knows the device is used in association with the user profile, the system may also have formatting preferences. In some cases, the aggregated message log may be stored in a format that does not require changing for some or all of the plurality of devices, in which case module 710 is obviated, at least to the extent compiling is called for.

In the example of FIG. 7, the flowchart 700 continues to module 712 where at least a portion of the aggregated message log is provided in response to the request.

Figure 8:
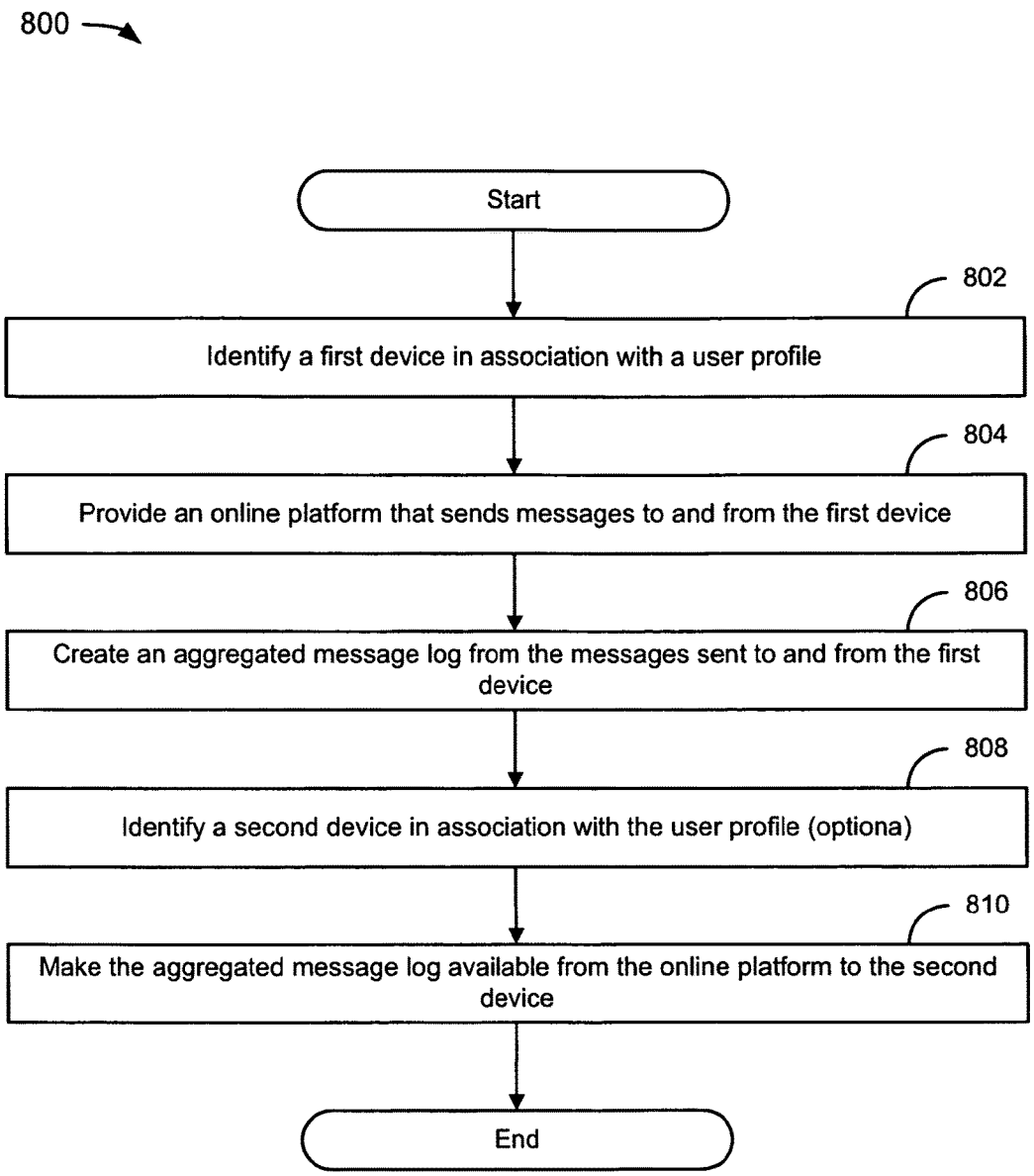
FIG. 8 depicts a flowchart of another example of a method for message log aggregation and provisioning.

FIG. 8 depicts a flowchart 800 of another example of a method for message log aggregation and provisioning. In the example of FIG. 8, the flowchart 800 starts at module 802 where a first device is identified in association with a user profile. The device may be any device that is capable of sending or receiving messages (typically, though not necessarily, both sending and receiving). Such a device may include, by way of example but not limitation, a browser embodied in a computer-readable medium.

In the example of FIG. 8, the flowchart 800 continues to module 804 where an online platform is provided that sends messages to and from the first device. In a non-limiting embodiment, the online platform would forward outgoing messages from the first device and forward incoming messages from a sender (not shown) to the first device. Thus, the online platform can serve as an intermediary between sender and recipient. Advantageously, the online platform can serve as intermediary for all devices associated with a user, enabling an aggregated message log to be generated from all of the user's devices with messages that pass through the online platform.

In the example of FIG. 8, the flowchart 800 continues to module 806 where an aggregated message log is created from the messages sent to and from the first device. The message log may be aggregated from entries associated with each message sent to or from the first device. Advantageously, the message log can also be aggregated from entries associated with messages sent to or from other devices associated with the user. For example, the message log could aggregate both, e.g., cell phone chat histories and, e.g., game console chat histories into the message log for a user.

In the example of FIG. 8, the flowchart 800 continues to module 808 where a second device is identified in association with the user profile. This module is optional because the user could use a single device (i.e., the first device) to send and receive messages and to receive the aggregated message log.

In the example of FIG. 8, the flowchart 800 continues to module 810 where the aggregated message log is made available from the online platform to the second device. Thus, the first device could include, e.g., a cell phone and the second device could include, e.g., a browser embodied in a computer readable medium on a laptop computer. The user would be able to access the cell phone chatlog online on the laptop computer. As was noted with reference to module 808, the first device and the second device may be the same device. That is, an IM message log associated with, e.g., a smart phone could be aggregated at the online platform, and then the same smart phone could be used to access the aggregated message log.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A server system that is provided separately from and coupled to a server of a first network and a server of a second network, the system comprising:
    a message history database, embodied in a non-transitory computer-readable medium;
    a database interface for accessing the message history database;
    a history aggregation engine, embodied in the non-transitory computer-readable medium and coupled to the database interface, that generates a first message log associated with first messages sent to or from a device associated with a user through the server system and the first network in the message history database, generates a second message log associated with second messages sent to or from a device associated with the user through the server system and the second network in the message history database, and aggregates each of the first message log and the second message log into an aggregated message log associated with the user;
    an online history provisioning engine, embodied in the non-transitory computer-readable medium and coupled to the database interface, that provides at least part of the aggregated message log associated with the user from the message history database to a requesting device, said at least part of the aggregated message log including at least part of the first message log and at least part of the second message log;
    an event queue that collects new first messages and new second messages;
    wherein when new messages are collected in the event queue:
        the history aggregation engine generates an updated first message log in the message history database, generates an updated second message log in the message history database, and aggregates each of the updated first message log and the updated second message log into an updated aggregated message log associated with the user;
        the online history provisioning engine provides at least part of the updated aggregated message log associated with the user to the requesting device, said at least part of the updated aggregated message log including at least part of the updated first message log and at least part of the updated second message log.

2. The system of claim 1, wherein, in operation, the history aggregation engine receives the first messages through the first network and forms the first message log thereby, and receives the second messages through the second network and forms the second message log thereby.

3. The system of claim 1, further comprising:
    a user profile database, embodied in the non-transitory computer-readable medium, including a user record that stores sufficient user profile data to determine aggregation of the first message log and the second message log into the aggregated message log.

4. The system of claim 1, wherein, in operation, the history aggregation engine forms the aggregated message log on the fly.

5. A method of managing a message log at a server system that is provided separately from and coupled to a server of a first network and a server of a second network, the method comprising:
    generating a first message log associated with first messages sent to or from a device associated with a user through the server system and the first network in a message history database;
    generating a second message log associated with second message messages sent to or from a device associated with the user through the server system and the second network in the message history database;
    aggregating each of the first message log and the second message log into an aggregated message log associated with the user;
    providing at least part of the aggregated message log associated with the user to a requesting device, said at least part of the aggregated message log including at least part of the first message log and at least part of the second message log;
    collecting new first messages and new second messages;
    when new messages are collected:
        generating an updated first message log in the message history database;
        generating an updated second message log in the message history database;
        aggregating each of the updated first message log and the updated second message log into an updated aggregated message log associated with the user;
        providing at least part of the updated aggregated message log associated with the user to the requesting device, said at least part of the updated aggregated message log including at least part of the updated first message log and at least part of the updated second message log.

6. The system of claim 1, wherein the history aggregation engine aggregates each of the first message log and the second message log into the aggregated message log in response to the request for the aggregated message log.

7. The system of claim 1, wherein the history aggregation engine aggregates each of the first message log and the second message log into the aggregated message log in response to the request for the aggregated message log, wherein the first message log is stored in the message history database in a first format before aggregation into the aggregated message log, and the second message log is stored in the message history database in a second format before aggregation into the aggregated message log.

8. The system of claim 1, wherein the history aggregation engine aggregates the first message log into the aggregated message log responsive to the first messages being sent, and aggregates the second message log into the aggregated message log responsive to the second messages being sent.

9. The system of claim 1, wherein the history aggregation engine aggregates the first message log into the aggregated message log responsive to the first messages being sent, by converting a format of the first message log into an aggregated log format, and aggregates the second message log into the aggregated message log responsive to the second messages being sent, by converting a format of the second message log into the aggregated log format, and the format of the aggregated message log is caused to be in the first format or the second format, responsive to the request for the aggregated message log from the requesting device.

10. The system of claim 1, wherein the history aggregation engine aggregates the first message log into the aggregated message log responsive to the first messages being sent, and aggregates the second message log into the aggregated message log responsive to the second messages being sent, and the history aggregation engine compiles the at least part of the aggregated message log selectively from the aggregated message log, responsive to the request for the aggregated message log.

11. The system of claim 1, wherein the requesting device is different from the device to or from which the first messages are sent and different from the device to or from which the second messages are sent.

12. The system of claim 1, wherein the device to or from which the first messages are sent is different from the device to or from which the second messages are sent, and the requesting device is one of the device to or from which the first messages are sent and the device to or from which the second messages are sent.

13. The method of claim 5, wherein the aggregating each of the first message log and the second message log into the aggregated message log comprises aggregating each of the first message log and the second message log into the aggregated message log in response to the request for the aggregated message log.

14. The method of claim 5, wherein the aggregating each of the first message log and the second message log into the aggregated message log comprises aggregating each of the first message log and the second message log into the aggregated message log in response to the request for the aggregated message log, wherein the first message log is stored in the message history database in a first format before aggregation into the aggregated message log, and the second message log is stored in the message history database in a second format before aggregation into the aggregated message log.

15. The method of claim 5, wherein the aggregating each of the first message log and the second message log into the aggregated message log comprises:

aggregating the first message log into the aggregated message log responsive to the first messages being sent, by converting a format of the first message log into an aggregated log format;

aggregating the second message log into the aggregated message log responsive to the second messages being sent, by converting a format of the second message log into the aggregated log format, wherein the format of the aggregated message log is caused to be in the first format or the second format, responsive to the request for the aggregated message log from the requesting device.

16. The method of claim 5, wherein the requesting device is different from the device to or from which the first messages are sent and different from the device to or from which the second messages are sent.

* * * * *